United States Patent [19]

Fee

[11] Patent Number: 5,663,822
[45] Date of Patent: Sep. 2, 1997

[54] OPTICAL COMB GENERATOR USING OPTICAL WHITE NOISE SOURCE

[75] Inventor: John A. Fee, Plano, Tex.

[73] Assignee: MCI Corporation, Washington, D.C.

[21] Appl. No.: 490,392

[22] Filed: Jun. 14, 1995

[51] Int. Cl.[6] ............................................. H04B 10/00
[52] U.S. Cl. ........................... 359/161; 359/126; 359/132; 359/341
[58] Field of Search ............................. 359/115, 120, 359/121, 126, 128, 132, 167, 179, 341, 161

[56] References Cited

U.S. PATENT DOCUMENTS

| | | | |
|---|---|---|---|
| 4,625,305 | 11/1986 | Epworth | 359/125 |
| 4,658,394 | 4/1987 | Cheng et al. | 359/126 |
| 4,791,630 | 12/1988 | Priatko | 359/128 |
| 4,945,531 | 7/1990 | Suzuki | 359/128 |
| 4,989,201 | 1/1991 | Glance | 359/125 |
| 5,153,933 | 10/1992 | Smith et al. | 385/27 |
| 5,224,183 | 6/1993 | Dugan | 385/24 |
| 5,226,053 | 7/1993 | Cho et al. | 372/45 |
| 5,267,256 | 11/1993 | Saruwatari et al. | 372/94 |
| 5,347,525 | 9/1994 | Faris | 372/19 |
| 5,452,116 | 9/1995 | Kirkby et al. | 359/341 |
| 5,481,399 | 1/1996 | Nagel et al. | 359/341 |
| 5,548,603 | 8/1996 | Calvani et al. | 372/25 |

OTHER PUBLICATIONS

Hunkin et al, Frequency-locking of External Cavity Semiconductor Laser Using an Optical Comb Generator, Feb. 1986 Electronics Letters V. 22 No. 2.

*Primary Examiner*—Wellington Chin
*Assistant Examiner*—Rafael Bacares

[57] ABSTRACT

A system and method for multi-wavelength modulated optical communication uses the same optical fiber without the use of multiple tuned lasers. A transmitter includes an optical comb generator and a digital modulator. The optical comb generator generates a broad spectrum of wavelengths using a white noise generator. A Fabry-Perot cavity filters the wavelengths to form a set of equally spaced resonances lambda-1 . . . lambda-n. The comb generator is locked to a particular wave length by comparing each carrier or the composite mean of the carriers to an optical reference. An error signal is generated and fed back into the into comb generator. The resonances are split into n-channels using a tree splitter. Each channel is modulated in the digital modulator. The channels are summed as an optical signal and amplified to ensure proper power levels prior to being fed to an optical fiber.

10 Claims, 2 Drawing Sheets

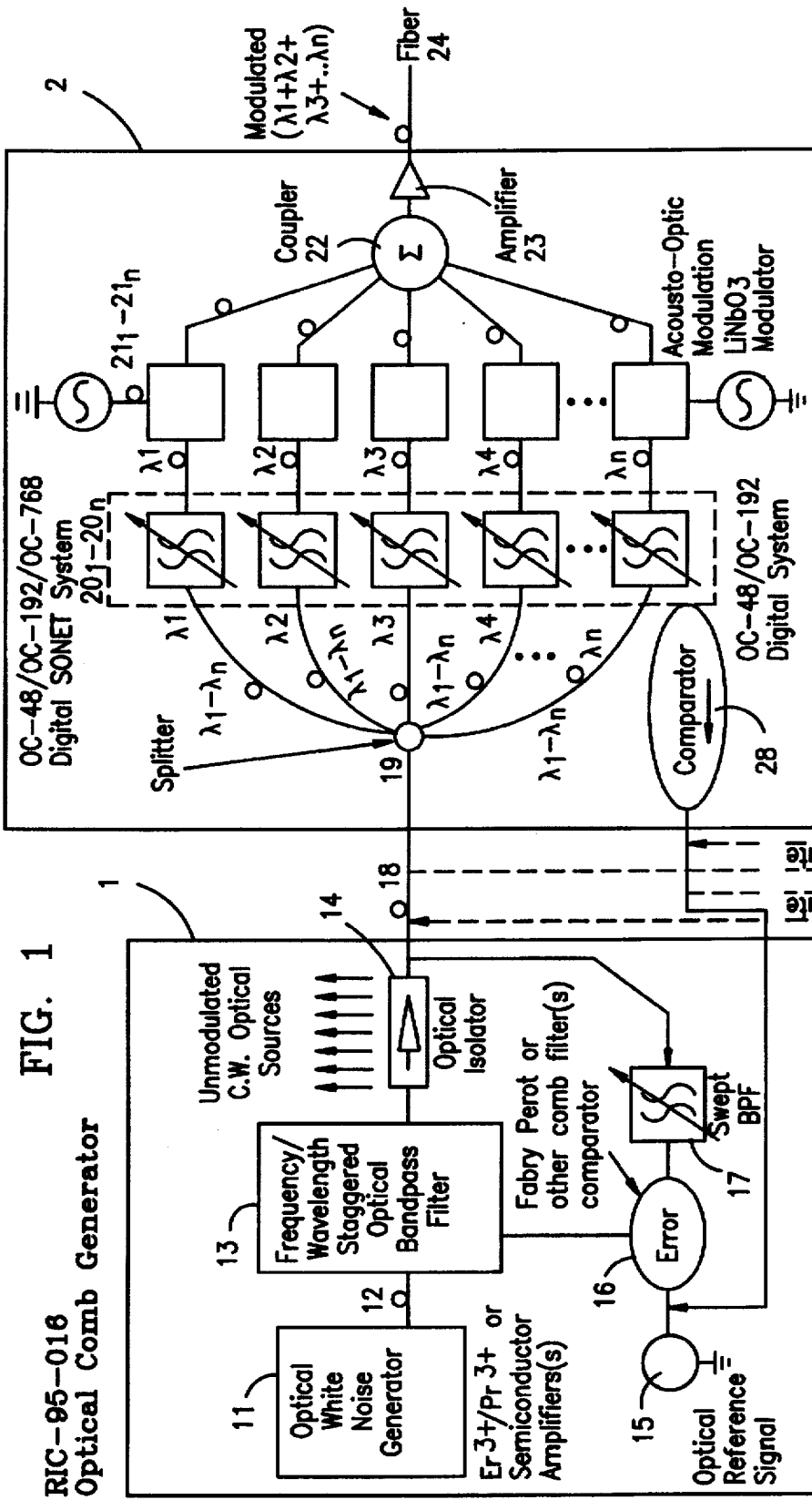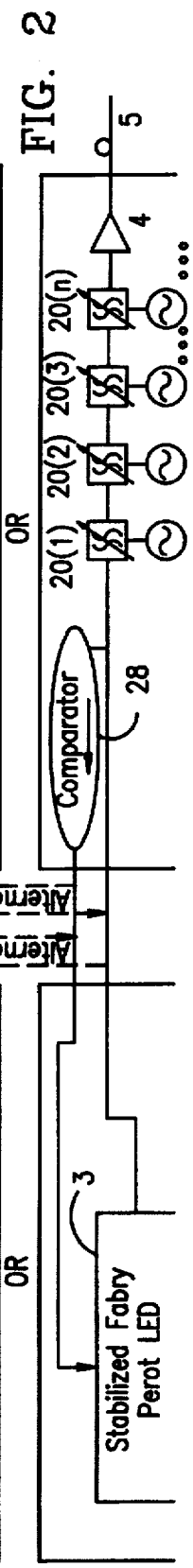

5,663,822

OPTICAL COMB GENERATOR USING OPTICAL WHITE NOISE SOURCE

BACKGROUND OF THE INVENTION

(1) Field of the Invention

This invention relates to a telecommunication network using optical fibers. More particularly, the invention relates to generating multiple carriers using an optical comb generator and modulator for multi-wavelength optical communications in an optical fiber.

(2) Background Information

The goal of optical communication is to send as much information as possible on a single optical fiber. One way to accomplish this goal is to generate, modulate and combine multiple wavelengths on the same optical fiber, i.e., to multiplex the communications using plural carriers. Prior methods to accomplish the optical multiplexing of data have required the use of plural narrowband light sources such as semiconductor lasers. Although multiplexed communication by means of plural laser sources may increase the communication capability of a fiber, such a method also incurs the expense of complexity, increased cost and poor reliability. For example, when using plural lasers, it is necessary to accurately tune the lasers to the plurality of desired wavelengths. Accordingly, the ability to generate a plurality of optical carriers without the use of multiple discretely tuned lasers would advance the state of the art in transmitting multiple wavelengths on the same optical fiber.

SUMMARY OF THE INVENTION

An object of the present invention is a system and method for providing a multiple wavelength communication source using the same optical fiber wherein the source does not require multiple tuned lasers.

Another object is a system and method for artificially generating a comb of frequencies and selectively modulating, combining, amplifying desired carrier frequencies which are fed into the same optical fiber.

Another object is a system and method using an optical comb generator and a digital modulator to generate a plurality of optical carriers for a multiplexed optical communication system.

These and other objects, features and advantages are accomplished in an optical comb generator and a digital modulator. The comb generator includes an optical white noise generator coupled to a wavelength staggered optical bandpass filter which outputs a set of unmodulated optical carriers. After passing through an optical isolator the set of carriers is then transferred through a splitter to a digital modulator system which consists of a plurality of tunable optical bandpass filters, each filter tuned to a particular wavelength of the optical carriers in the comb. The output of each filter is fed into an acousto-optic modulator. Each modulated wavelength is summed by means of an optical coupler, sent to an amplifier and transmitted onto the communications fiber. A signal feedback loop ensures stability of the system using an optical reference system.

DESCRIPTION OF THE DRAWING

FIG. 1 is a block diagram showing the elements of the present invention.

FIG. 2 is a block diagram of an alternative embodiment of the present invention.

DETAILED DESCRIPTION OF PREFERRED EMBODIMENT

Figure 3:
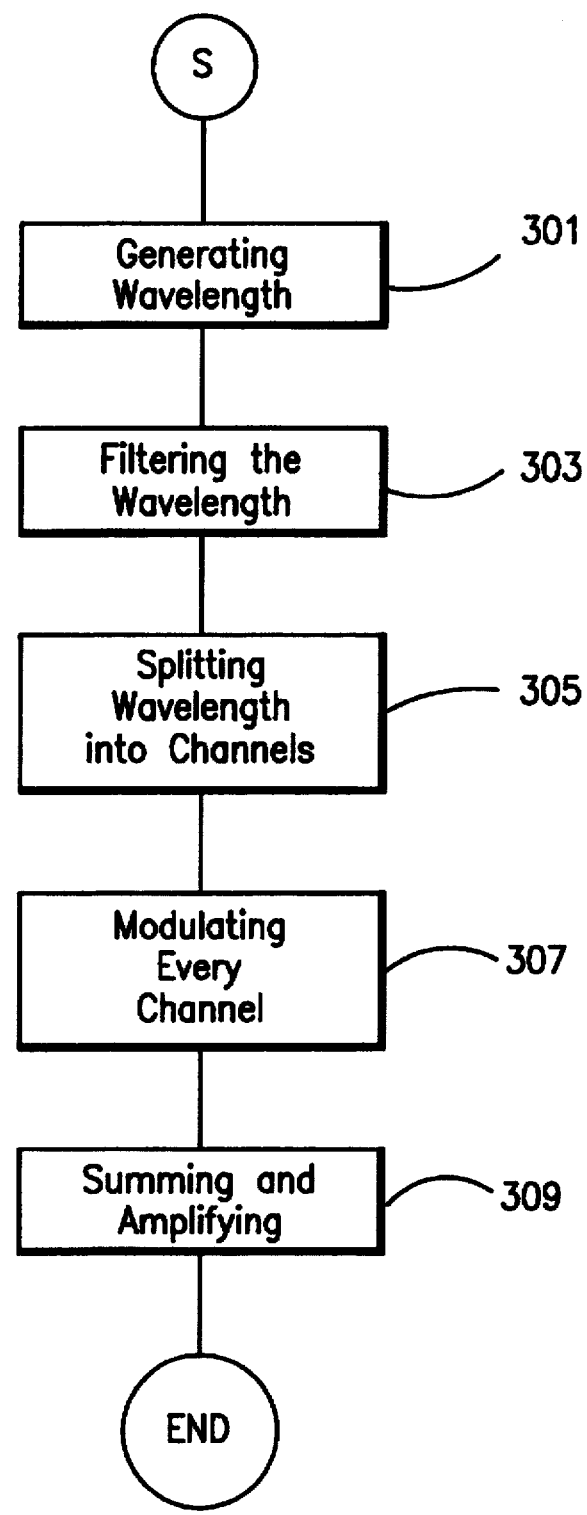
FIG. 3 is a flow diagram of a process which implements the invention of FIGS. 1 and 2.

In FIG. 1 the invention comprises an optical comb generator 1 coupled to a digital modulator 2, the combination configured for use within a synchronous optical network system, having data rates between approximately 50 Mbit/s and 50 Gbit/s. The generator 1 includes an optical white noise generator 11 implemented with an optical amplifier such as a semiconductor amplifier. The amplifier may be composed of a substrate of fluoride glass doped with Erbium or Praseodymium End includes a laser pump source for producing the desired white noise. The amplifier could also be realized using a multistage optical fiber optic amplifier with sequential fiberoptic elements with different doping characteristics in order to obtain a wider emission spectrum. The optical white noise generator upon being stimulated will then emit a broad spectrum of wavelengths bounded by upper and lower wavelengths which are in part defined by the selected dopant and the wavelength of the stimulating source. The output of the optical white noise generator 11 is fed through a directional optical coupler 12 to a wavelength staggered optical bandpass filter 13, such as a Fabry-Perot comb generator, which will emit a set of equally spaced resonances at specific wavelengths characteristic of the Fabry-Perot cavity. The functions and structures of optical isolators and Fabry-Perot optical cavities are well known to those skilled in the art and will not be further discussed herein. Thus, the output of the wavelength staggered optical bandpass filter 13 consists of a comb of unmodulated optical carriers of wavelengths lambda-1 through lambda-n which are fed to an optical isolator 14.

The Fabry-Perot comb generator may be locked to a particular wavelength by comparing either each of the carriers of the comb, or the composite mean of the carriers of the comb to an optical reference 15. This is achieved by sweeping an optical bandpass filter 17 and centering it on the peak of each of the comb sources. A Fabry-Perot or other comb filter comparator 16 is used to generate an error signal, which is used in a feed-back loop into the wavelength staggered optical bandpass filter 13. The optical reference signal is used as a standard wavelength source. In a preferred embodiment, the output of the optical isolator 14 is coupled via a fiber optic cable 18 to an n-channel tree splitter 19 which addresses each one of the input channels of a digital modulator 2.

Within the digital modulator 2, each of the n-channels is wavelength selected by appropriate bandpass filters 20(1) . . . 20(n) to isolate per each channel 1 through n the appropriate wavelength lambda-1 through lambda-n. Each of the channels is then modulated separately by a corresponding digital modulator such as an acousto-optic lithium-niobate modulator 21(1) . . . 21(n). All such modulated optical carriers are summed by an optical coupler 22 and fed to an in-line amplifier 23 to ensure proper power levels into the fiber 24. Each of the optical bandpass filters 20(1) . . . 20(n) in the coupler circuit may be locked to a reference wavelength to ensure stability. A comparator 28 is used to regulate the adjustable filters 20(1) . . . 20(n) by comparing each individual filter to the output of the reference signal generator 15 and continuously calculating the proper filter value for each filter.

An alternative embodiment for the optical comb generator of the invention is shown in FIG. 2. In this embodiment the optical white noise generator 11 and the wavelength staggered optical bandpass filter 13 of FIG. 1 are combined in a single unit comprising a stabilized Fabry-Perot LED 3, which comprises essentially an LED between partially reflective mirrors forming the Fabry-Perot cavity. The LED generates a band of optical wavelengths having sufficient bandwidth to include all desired carrier wavelengths. The carrier wavelengths are accentuated by the Fabry-Perot cavity according to the resonant modes of the cavity, with carrier tooth width and number dependent in part on the "Q" of the cavity. An example of a Fabry-Perot stabilized LED is U.S. Pat. No. 5,226,053 by Cho et. al., the specification of which is incorporated herein by reference. In addition to the parallel modulator shown in FIG. 1, the digital modulator 2 can be configured as a series arrangement of notch filters 20(1) . . . 20(n), as shown in FIG. 2. Each notch filter selectively modulates a selected wavelength. A feedback path may be used with a comparator to generate an error signal in a manner similar to that described for FIG. 1.

It can be seen that the invention provides an efficient source of generating a plurality of optical carriers without the use of multiple discretely tuned lasers by simply using either a white noise generator with a coupled Fabry-Perot cavity described in the first embodiment above, or the combined Fabry-Perot stabilized LED of the second embodiment, combined with either an additive digital modulator (using bandpass filters) as in the first embodiment or a substractive digital modulator such as the notch filters 20 as shown in the FIG. 2 embodiment.

With reference to FIG. 3, the following method for generating multiple optical carriers for the same optical fiber without the use of multiple tuned lasers is shown to comprise the following steps:

a) generating a broad spectrum of wavelengths using a white noise generator (step block 301);

b) filtering the wavelengths to form a set of equally spaced resonances lambda-1 . . . lambda-n using a wavelength staggered optical bandpass filter (block 303), (such filter may be the Fabry-Perot comb generator mentioned above.);

c) splitting the resonances into n-channels using a tree splitter (block 305);

d) modulating each channel in the digital modulator (block 307) which, as is well known, may be effected by means of bandpass filters; and e) summing and amplifying the channels as an optical signal to ensure proper power levels prior to feeding a signal to an optical fiber, per step block 309.

What is claimed is:

1. A transmitter for multi-wavelength modulated optical communication, comprising:

a) an optical white noise generator having an optical amplifier stimulated by a laser for providing an output of a broad spectrum of wavelengths;

b) a wavelength staggered optical bandpass filter, coupled to said optical white noise generator and responsive to said output, for generating a series of equally spaced optical information carriers in the form of a comb of optical wavelengths;

c) a digital modulator means for receiving said comb of optical wavelengths, and synchronously modulating said comb of optical wavelengths; and d) an optical fiber coupled to said digital modulator means for transmitting said synchronously modulated comb of optical wavelengths.

2. The transmitter of claim 1, further comprising:

a plurality of bandpass filters;

reference means for locking each of said bandpass filters to a corresponding one of said optical information carriers having a particular wavelength by comparing the wavelength of said each bandpass filter to an optical reference signal derived from said comb of optical wavelengths.

3. The transmitter of claim 1, wherein said digital modulator means comprises:

an optical n-fold splitter for receiving said equally spaced optical information carriers;

a plurality of tunable optical bandpass filters coupled to the splitter;

a plurality of elemental modulators correspondingly coupled to said plurality of bandpass filters; and an n-fold optical coupler.

4. The transmitter as claimed in claim 1, wherein said digital modulator means comprises a plurality of selectively modulated notch filters arranged in series.

5. In a transmitter for multi-wavelength modulated optical communication, said transmitter including an optical comb generator and a digital modulator means, a method of generating optical carriers for transmission via an optical fiber without using multiple tuned lasers, comprising the steps of:

a) generating a broad spectrum of wavelengths using a white noise generator;

b) using a wavelength staggered optical bandpass filter for filtering said wavelengths to form a set of equally spaced resonances lambda-1 . . . lambda-n;

c) using a tree splitter for splitting said resonances into n-channels;

d) modulating each of said n-channels in said digital modulator means; and e) summing and amplifying said channels as an optical signal to ensure proper power levels prior to feeding said optical signal to an optical fiber.

6. The method of claim 5, wherein said step b further comprises the step of:

utilizing a Fabry-Perot comb generator for said wavelength staggered optical bandpass filter for emitting frequencies or carriers having characteristics reflective of a Fabry-Perot cavity.

7. The method of claim 6, further comprising the step of:

locking said comb generator to a particular wavelength by comparing each carrier or the composite mean of the carriers to an optical reference.

8. The method of claim 7, further comprising the step of:

sweeping an optical bandpass filter and centering said filter on the peak of each carrier.

9. The method of claim 8 further comprising the step of:

generating an error signal to be used as a feed-back to said comb generator to regulate the stability of said comb generator.

10. The method of claim 9, further comprising the steps of:

utilizing a Fabry-Perot LED for said comb generator;

utilizing a series arrangement of notch filters for the digital modulator means.

* * * * *